(12) United States Patent
Zhang et al.

(10) Patent No.: US 11,690,419 B1
(45) Date of Patent: Jul. 4, 2023

(54) PREPARATION TECHNOLOGY FOR ARTIFICIAL EYELASH WITH NATURALLY ARC-SHAPED STEM

(71) Applicant: Xiaoyan Zhang, Qingdao (CN)

(72) Inventors: Xiaoyan Zhang, Qingdao (CN); Zhaozhong Zhang, Qingdao (CN)

(73) Assignee: Xiaoyan Zhang, Qingdao (CN)

( * ) Notice: Subject to any disclaimer, the term of this patent is extended or adjusted under 35 U.S.C. 154(b) by 0 days.

(21) Appl. No.: 17/880,607

(22) Filed: Aug. 3, 2022

(30) Foreign Application Priority Data

Jul. 8, 2022 (CN) .......................... 202210804466.1

(51) Int. Cl.
| | |
|---|---|
| *A41G 5/02* | (2006.01) |
| *B29C 65/52* | (2006.01) |
| *B29C 65/50* | (2006.01) |
| *B29C 65/00* | (2006.01) |

(52) U.S. Cl.
CPC ................ *A41G 5/02* (2013.01); *B29C 65/50* (2013.01); *B29C 65/524* (2013.01); *B29C 66/0326* (2013.01); *B29C 66/8341* (2013.01); *B29C 66/90* (2013.01)

(58) Field of Classification Search
CPC ........ A41G 5/02; B29C 65/50; B29C 65/524; B29C 66/0326; B29C 66/8341; B29C 66/90
See application file for complete search history.

(56) References Cited

U.S. PATENT DOCUMENTS 9,993,041 B2 * 6/2018 Wibowo .................. A41G 5/02

FOREIGN PATENT DOCUMENTS

| CN | 101773310 A | 7/2010 |
|---|---|---|
| CN | 103734961 A | 4/2014 |

* cited by examiner

*Primary Examiner* — Daniel H Lee

(57) ABSTRACT

Disclosed is a preparation technology for an artificial eyelash with a naturally arc-shaped stem, which automatically presses and sticks artificial eyelash by providing a transmission mechanism for transmitting a double-sided adhesive tape, a limiting mechanism for storing the artificial eyelash, a pressing mechanism for pressing the double-sided adhesive tape to the limiting mechanism to stick the artificial eyelash and a control mechanism; automatically synthesizes the artificial eyelash by providing a feeding roller assembly, a distributing roller assembly, a synthesis extrusion roller assembly, a recycling roller assembly and a collecting roller; and automatically glues and shears the artificial eyelash by eyelash thread rollers, front limiting rollers, glue injection mechanisms, rear limiting rollers, drying mechanisms and finished product rollers symmetrically arranged on two sides of a multi-layer eyelash sticker. Through the processing technology, the labor cost is saved and the processing efficiency of the artificial eyelash is improved.

2 Claims, 8 Drawing Sheets

PREPARATION TECHNOLOGY FOR ARTIFICIAL EYELASH WITH NATURALLY ARC-SHAPED STEM

CROSS REFERENCE TO RELATED APPLICATIONS

This application claims foreign priority of Chinese Patent Application No. 202210804466.1, filed on Jul. 8, 2022 in the China National Intellectual Property Administration, the disclosures of all of which are hereby incorporated by reference.

TECHNICAL FIELD

The present invention relates to the technical field of eyelash manufacturing, and particularly to a preparation technology for an artificial eyelash with a naturally arc-shaped stem.

BACKGROUND

An artificial eyelash can only be curled after being sheared. In order to manufacture an artificial eyelash with a naturally arc-shaped stem, the artificial eyelash should be manufactured into a qualified multi-layer eyelash sticker product by steps. Steps of an existing preparation technology are mainly divided into three flows: manufacturing of a single-layer eyelash sticker, synthesis of a multi-layer eyelash sticker, and gluing and shearing.

For the manufacturing of the single-layer eyelash sticker, an eyelash raw material needs to be manually placed in a mold groove, and then a double-sided adhesive tape is pressed on a surface of the eyelash raw material to stick the eyelash raw material with the double-sided adhesive tape. For the manufacturing of the multi-layer eyelash sticker, the manufactured single-layer eyelash stickers are stuck on a paperboard layer by layer, and interleaving paper on the double-sided adhesive tape of each layer of eyelash sticker is torn off, so as to ensure that a multi-layer product as good as a natural eyelash can be produced. For the gluing and shearing, an eyelash thread is arranged in parallel with the double-sided adhesive tape, and glue is applied to the eyelash thread. After the glue is solidified, the product is sheared in a direction parallel to the double-sided adhesive tape.

Since a radius of the artificial eyelash ranges from 0.05 mm to 0.15 mm, an excessively small size is inconvenient for clamping the artificial eyelash. Therefore, up to now, there is no complete-flow automated assembly line for the production and preparation of the artificial eyelash. Manual production is still adopted in the prior art, and one worker can produce about 100 to 150 eyelash stickers every day. An existing processing technology for the artificial eyelash faces the problems of high labor cost and low processing efficiency.

Therefore, a preparation technology for an artificial eyelash with a naturally arc-shaped stem is put forward.

SUMMARY

The present invention aims to provide a preparation technology for an artificial eyelash with a naturally arc-shaped stem, which automatically presses and sticks artificial eyelash by providing a transmission mechanism, a pressing mechanism, a limiting mechanism and a control mechanism; automatically synthesizes the artificial eyelash by providing a feeding roller assembly, a distributing roller assembly, a synthesis extrusion roller assembly, a recycling roller assembly and a collecting roller; and automatically glues and shears the artificial eyelash by eyelash thread rollers, front limiting rollers, glue injection mechanisms, rear limiting rollers, drying mechanisms and finished product rollers symmetrically arranged on two sides of a multi-layer eyelash sticker, so as to solve the problems of high labor cost and low processing efficiency of the artificial eyelash put forward in the background above.

In order to achieve the object above, the present invention provides the following technical solutions.

An automatic pressing and sticking device for an artificial eyelash with a naturally arc-shaped stem comprises a transmission mechanism for transmitting a double-sided adhesive tape, a limiting mechanism for storing the artificial eyelash, a pressing mechanism for pressing the double-sided adhesive tape to the limiting mechanism to stick the artificial eyelash, and a control mechanism, wherein:

the transmission mechanism comprises two conveying rollers arranged on two sides of the limiting mechanism; the double-sided adhesive tape is wound on the conveying roller; and the double-sided adhesive tape horizontally penetrates through a horizontal symmetry axis of the limiting mechanism from left to right;

the limiting mechanism comprises a bottom plate, a frame, an upper fixed module, a lower fixed module and an adjusting screw, and the frame is fixedly connected and arranged above the bottom plate; the upper fixed module is fixedly connected with an inside surface of an upper portion of the frame; the lower fixed module is internally provided with a threaded hole; and the adjusting screw penetrates through the threaded hole to move a lower fixed plate in a direction perpendicular to the double-sided adhesive tape;

the control mechanism comprises a servo motor for controlling the two conveying rollers to rotate, a photoelectric sensor and a controller; and the servo motor, the sensor and the controller are electrically connected; and the photoelectric sensor is fixedly arranged at an upper portion of the bottom plate, the photoelectric sensor is located on a right side of the upper fixed module, and the photoelectric sensor is 1 mm to 2 mm away from the horizontal symmetry axis of the limiting mechanism.

Preferably, the pressing mechanism comprises an air cylinder, a fixed frame, a pressing plate and a distributing plate;

the fixed frame is fixedly connected with the bottom plate; the air cylinder is fixedly arranged at a lower portion of the fixed frame, and a telescopic rod of the air cylinder is fixedly connected with the pressing plate; the telescopic rod drives the pressing plate to move up and down; a horizontal symmetry axis of the pressing plate coincides with the horizontal symmetry axis of the limiting mechanism; the air cylinder is electrically connected with the controller; and the distributing plate is slidably connected with the frame and vertically slides up and down along the frame.

Preferably, a lower surface of the pressing plate is provided with a bulge, and the bulge corresponds to a recess on the distributing plate.

Preferably, the limiting mechanism is obliquely arranged at an included angle of 5° to 10° with a horizontal plane, and a vertical height of the upper fixed module is lower than that of the lower fixed module.

Preferably, one side of the telescopic rod is fixedly connected with a punching assembly; and the punching assembly comprises a horizontal fixed rod, a vertical punching rod fixedly arranged at a lower portion of the horizontal fixed rod and a punching seat matched with the vertical punching rod; and the punching seat is fixedly arranged at an upper portion of the bottom plate, and a hole for the vertical punching rod to penetrate through is formed in the punching seat.

An automatic synthesis device for an artificial eyelash adopts a single-layer eyelash sticker produced by the automatic pressing and sticking device for the artificial eyelash above, and further comprises a feeding roller assembly, a distributing roller assembly arranged on a left side of the feeding roller, a synthesis extrusion roller assembly arranged on a left side of the distributing roller assembly, a recycling roller assembly for recovering interleaving paper and a collecting roller for collecting a multi-layer eyelash sticker;

the feeding roller assembly, the distributing roller assembly, the synthesis extrusion roller assembly, the recycling roller assembly and the collecting roller are all provided with a fixing device for fixing;

the automatic synthesis device for the artificial eyelash is used for synthesizing more than three single-layer eyelash stickers into a multi-layer eyelash sticker;

the feeding roller assembly comprises N feeding rollers, N is greater than 3, and N is a natural number;

the distributing roller assembly comprises N distributing rollers, the synthesis extrusion roller assembly is composed of two extrusion rollers arranged in elastic contact, and the recycling roller assembly comprises N recycling rollers; N sets of single-layer eyelash stickers are provided; the N sets of single-layer eyelash stickers are respectively separated from the interleaving paper on the single-layer eyelash stickers through the N distributing rollers; and the separated interleaving paper is recovered through the recycling roller assembly; and the N sets of single-layer eyelash stickers pass through the two extrusion rollers and then are wound on the collecting roller assembly.

Preferably, the collecting roller assembly is composed of one collecting roller or N collecting rollers.

An automatic gluing and shearing device adopts the multi-layer eyelash sticker produced by the automatic synthesis device for the artificial eyelash above, wherein the multi-layer eyelash sticker is wound on a feeding roller, and the multi-layer eyelash sticker sequentially passes through an eyelash thread roller, a front limiting roller, a glue injection mechanism, a rear limiting roller and a cutting mechanism from left to right;

the eyelash thread roller, the front limiting roller, the glue injection mechanism, the rear limiting roller, a drying mechanism and a finished product roller are all provided with a fixing device for fixing;

the eyelash thread roller places an eyelash thread on the multi-layer eyelash sticker through the front limiting roller;

the glue injection mechanism injects glue on the eyelash thread;

the rear limiting roller leads out the multi-layer eyelash sticker with the glue and the eyelash thread;

the cutting mechanism performs linear cutting along the horizontal symmetry axis of the limiting mechanism;

the multi-layer eyelash sticker is divided into a finished product and a waste material after being cut by the cutting mechanism; and the finished product enters a finished product roller, and the waste material enters a waste material roller; and one eyelash thread is an elastic thread, and the other eyelash thread is a non-elastic thread.

Preferably, the eyelash thread rollers, the front limiting rollers, the glue injection mechanisms, the rear limiting rollers and the finished product rollers are all symmetrically arranged along upper and lower surfaces of the multi-layer eyelash sticker.

A preparation technology for an artificial eyelash with a naturally arc-shaped stem adopts the automatic gluing and shearing device above, and comprises the following steps of:

step A: placing the cut artificial eyelash between the upper fixed module and the lower fixed module in the frame;

step B: adjusting a distance between the upper fixed module and the lower fixed module by rotating the adjusting screw to adapt to a size of the finished product of the artificial eyelash to be processed;

step C: winding the double-sided adhesive tape on surfaces of the two conveying rollers and allowing the double-sided adhesive tape to pass through the limiting mechanism;

step D: manually starting the pressing mechanism to test whether a pressing device is normal;

step E: starting the automatic pressing and sticking device;

step F: transferring the conveying roller with the single-layer eyelash sticker wound on a surface to the feeding roller in the feeding roller assembly;

step G: starting the automatic synthesis device for the artificial eyelash to finish manufacturing the multi-layer eyelash sticker;

step H: transferring the collecting roller with the multi-layer eyelash sticker wound on a surface to the automatic gluing and shearing device as the feeding roller; and step I: starting the automatic gluing and shearing device to finish gluing and shearing.

Compared with the prior art, the present invention has the beneficial effects as follows.

1. The artificial eyelashes of various sizes may be manufactured by using the distance-adjustable limiting mechanism in the automatic pressing and sticking device, thus improving an applicability of the equipment; the artificial eyelashes may be concentrated on one side under gravity by using the obliquely arranged bottom plate, thus reducing a number of times of manually rotating the adjusting screw, so as to prolong a service life of equipment; the air cylinder is used to push the bulge of the bottom plate of the distributing plate to be matched with the recess of the distributing plate, so that a pressing force can be larger and more sufficient, and a number and a density of the artificial eyelashes can be increased, and compared with manual operation, the automatic pressing and sticking technology for the artificial eyelash above is more efficient.

2. The compound processing of the single-layer eyelash stickers can be automatically realized by matching arrangement of various rollers of the automatic synthesis device for the artificial eyelash, which is more efficient compared with a method of manually distributing the single-layer eyelash stickers on a paperboard layer by layer and then manually removing the interleaving paper.

3. The arrangement of the eyelash thread, the glue injection, the drying and the shearing can be fully automatically operated by matching using of the eyelash thread roller, the front limiting roller, the glue injection mechanism, the rear limiting roller, the drying mechanism and the cutting mechanism of the automatic gluing and shearing device, thus solving the problems of a distribution difficulty of the eyelash thread, deviation of a glue injection amount by manual glue injection from a normal value and an error in manual cutting; and greatly improving a production efficiency of products and a rate of finished products.

Figure 1:
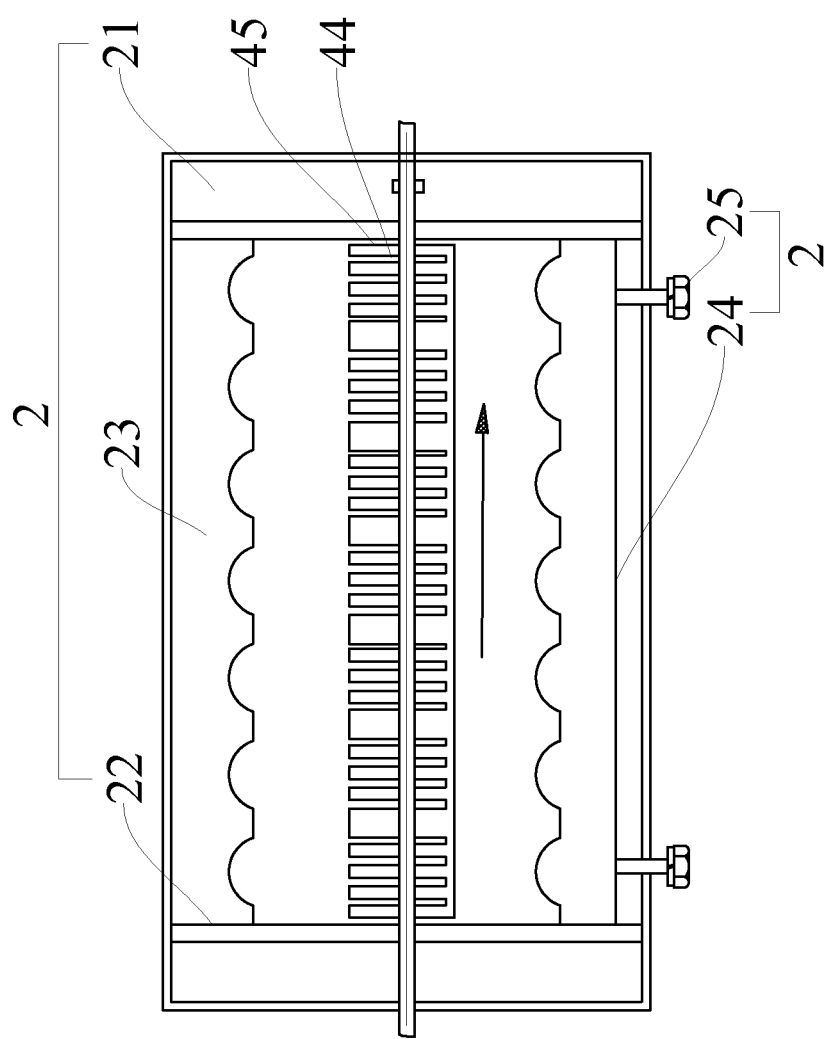
FIG. 1 is a schematic structural diagram of a limiting mechanism of the present invention.

In the drawings: 1 refers to conveying roller; 2 refers to limiting mechanism; 21 refers to bottom plate; 22 refers to frame; 23 refers to upper fixed module; 24 refers to lower fixed module; 25 refers to adjusting screw; 3 refers to control mechanism; 31 refers to photoelectric sensor; 32 refers to controller; 4 refers to pressing mechanism; 41 refers to air cylinder; 42 refers to pressing plate; 43 refers to bulge; 44 refers to recess; 45 refers to distributing plate; 5 refers to punching assembly; 51 refers to horizontal fixed rod; 52 refers to vertical punching rod; 53 refers to punching seat; 61 refers to feeding roller; 62 refers to distributing roller; 63 refers to extrusion roller; 64 refers to recycling roller; 65 refers to collecting roller; 71 refers to feeding roller; 72 refers to eyelash thread roller; 73 refers to front limiting roller; 74 refers to glue injection mechanism; 75 refers to rear limiting roller; 76 refers to finished product roller; 77 refers to waste material roller; 8 refers to cutting mechanism; 9 refers to cutting line; 10 refers to eyelash thread; and 11 refers to glue layer.

DETAILED DESCRIPTION

Working Principle:

A raw material artificial eyelash is placed between an upper fixed module 23 and a lower fixed module 24, then a double-sided adhesive tape on a left conveying roller 1 is manually operated to pass through a limiting mechanism 2 and then wound on a right conveying roller 1, a pressing mechanism 4 is manually started to finish first pressing, and then an automatic switch of an automatic pressing and sticking device is turned on. After the pressing mechanism 4 presses the double-sided adhesive tape and returns to an original position each time, a controller 32 controls a servo motor to rotate, and the servo motor controls the conveying roller 1 to rotate. Since the artificial eyelash stuck on the double-sided adhesive tape will block light, when a photoelectric sensor 31 arranged on a bottom plate 21 senses the existence of the artificial eyelash, a signal is transmitted to the controller 32 to keep normal running of the servo motor. When the photoelectric sensor detects N pulse signals, the N pulse signals have the same number as that of eyebrow models on the upper fixed module 23, the signals are fed back to the controller 32, the controller controls the servo motor to stop running, and then the pressing mechanism is started for pressing. Through the matching above, the double-sided adhesive tape enters the pressing mechanism 4 from the left conveying roller 1, and the double-sided adhesive tape may advance for a certain distance after being pressed once, so as to obtain single-layer eyelash stickers evenly distributed at intervals, and the single-layer eyelash stickers are rewound on the right conveying roller 1.

The conveying roller wound with the single-layer eyelash stickers is transferred to a feeding roller assembly as a feeding roller 61 for automatic synthesis of the artificial eyelash. The single-layer eyelash stickers pass through the feeding roller 61 and arrive a distributing roller 62, and then enter an extrusion roller 63 after interleaving paper on the double-sided adhesive tape is removed by the distributing roller 62, so that a plurality of single-layer eyelash stickers are gathered into one multi-layer eyelash sticker, and the multi-layer eyelash sticker is finally wound on a collecting roller. The removed interleaving paper passes through the distributing roller 62 and then enters a recycling roller 64, and the interleaving paper is wound on the recycling roller 64 for easy collection and cleaning.

The collecting roller 65 wound with the multi-layer eyelash sticker is transferred to an automatic gluing and shearing device as a feeding roller 71 for automatic gluing and shearing. The multi-layer eyelash sticker on the feeding roller 71 is conveyed to a right production line, an eyelash thread roller 72 leads in an eyelash thread 10, the eyelash thread 10 is pressed onto the multi-layer eyelash sticker through a front limiting roller 73, then glue injection mechanisms 74 symmetrically arranged on upper and lower surfaces finishes glue coating, and the coated glue arrives a rear limiting roller 75 after drying. The multi-layer eyelash sticker passing through the rear limiting roller 75 is conveyed to the cutting mechanism 8, and the cutting mechanism 8 cuts the multi-layer eyelash sticker along a the cutting line, so that the whole material is divided into two parts, wherein an upper part is wound on a finished product roller 76, and a lower part of waste material is wound on a waste material roller 77.

Figure 2:
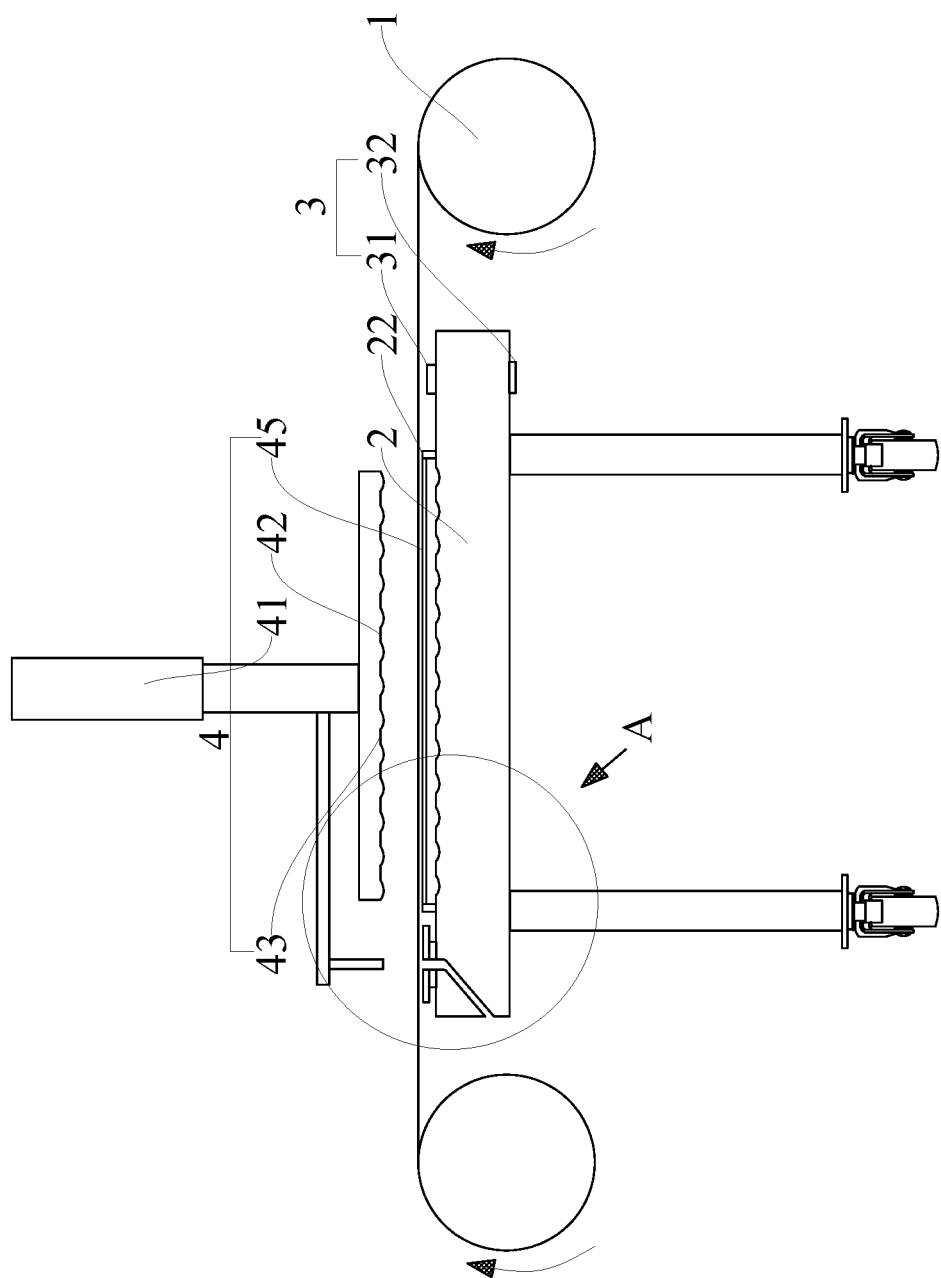
FIG. 2 is a schematic structural diagram of an automatic pressing and sticking device of the present invention.
Figure 3:
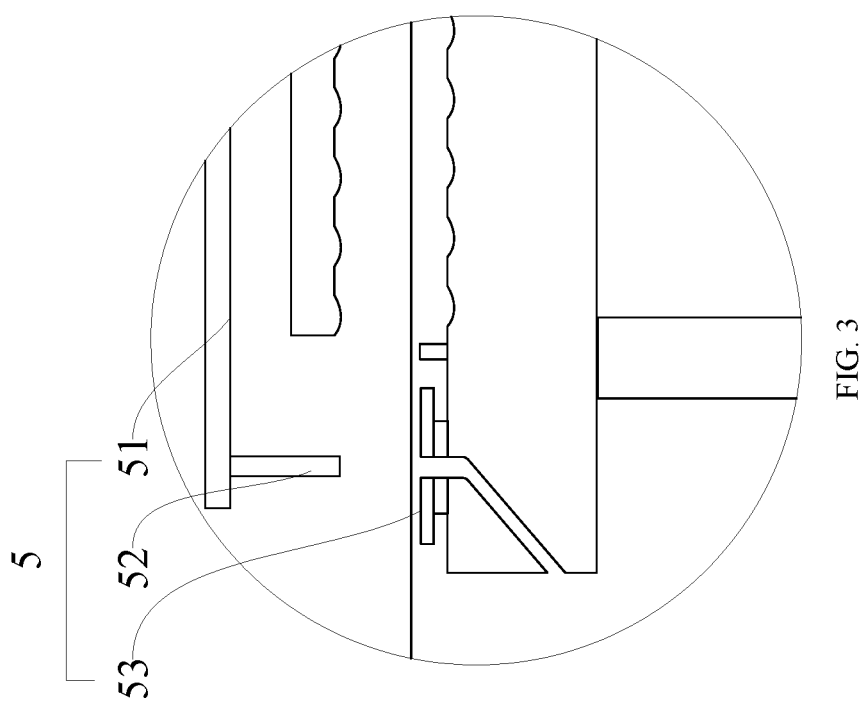
FIG. 3 is a locally enlarged view of an A part in FIG. 2.
Figure 4:
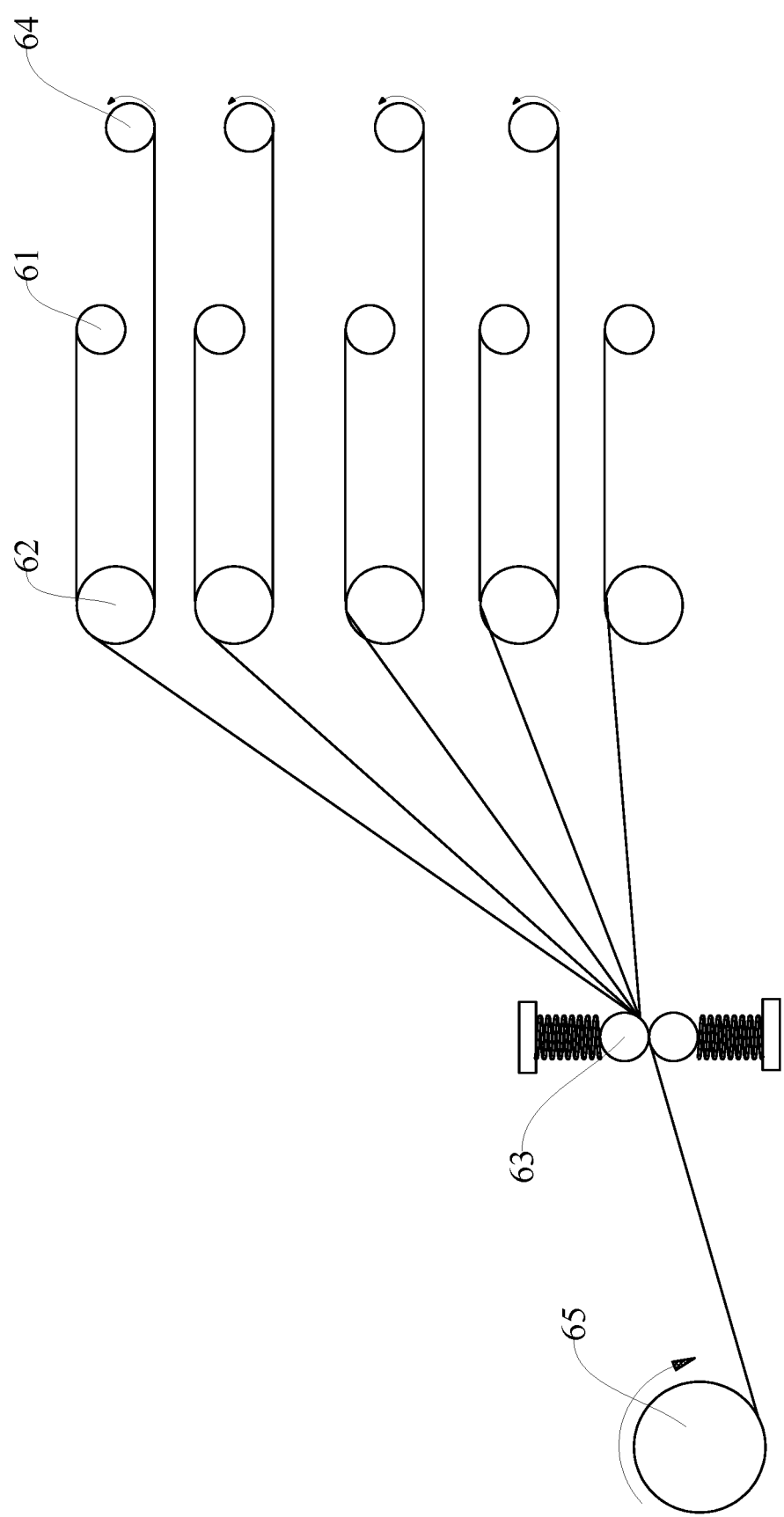
FIG. 4 is a schematic diagram of one embodiment of the automatic pressing and sticking device of the present invention.
Figure 5:
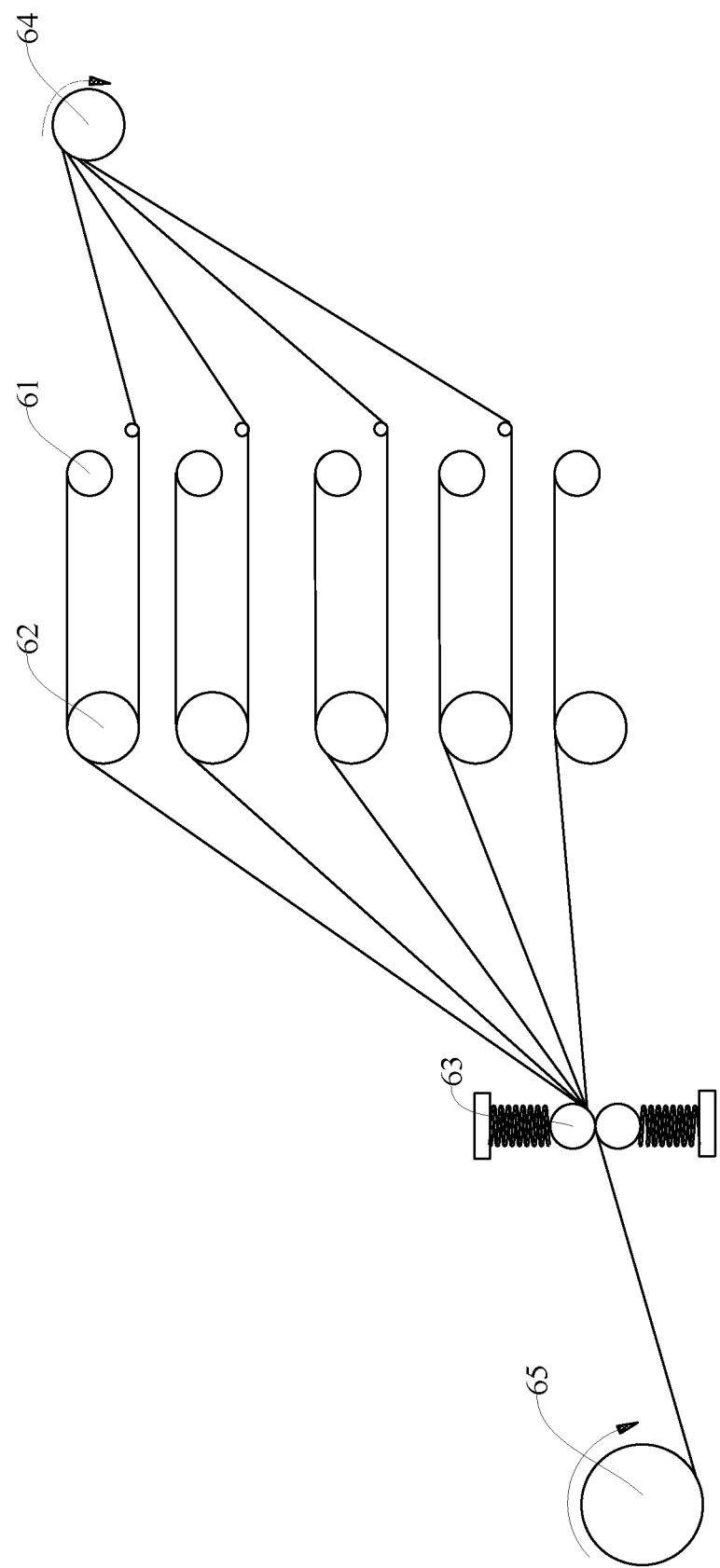
FIG. 5 is a schematic diagram of another embodiment of the automatic pressing and sticking device of the present invention.
Figure 6:
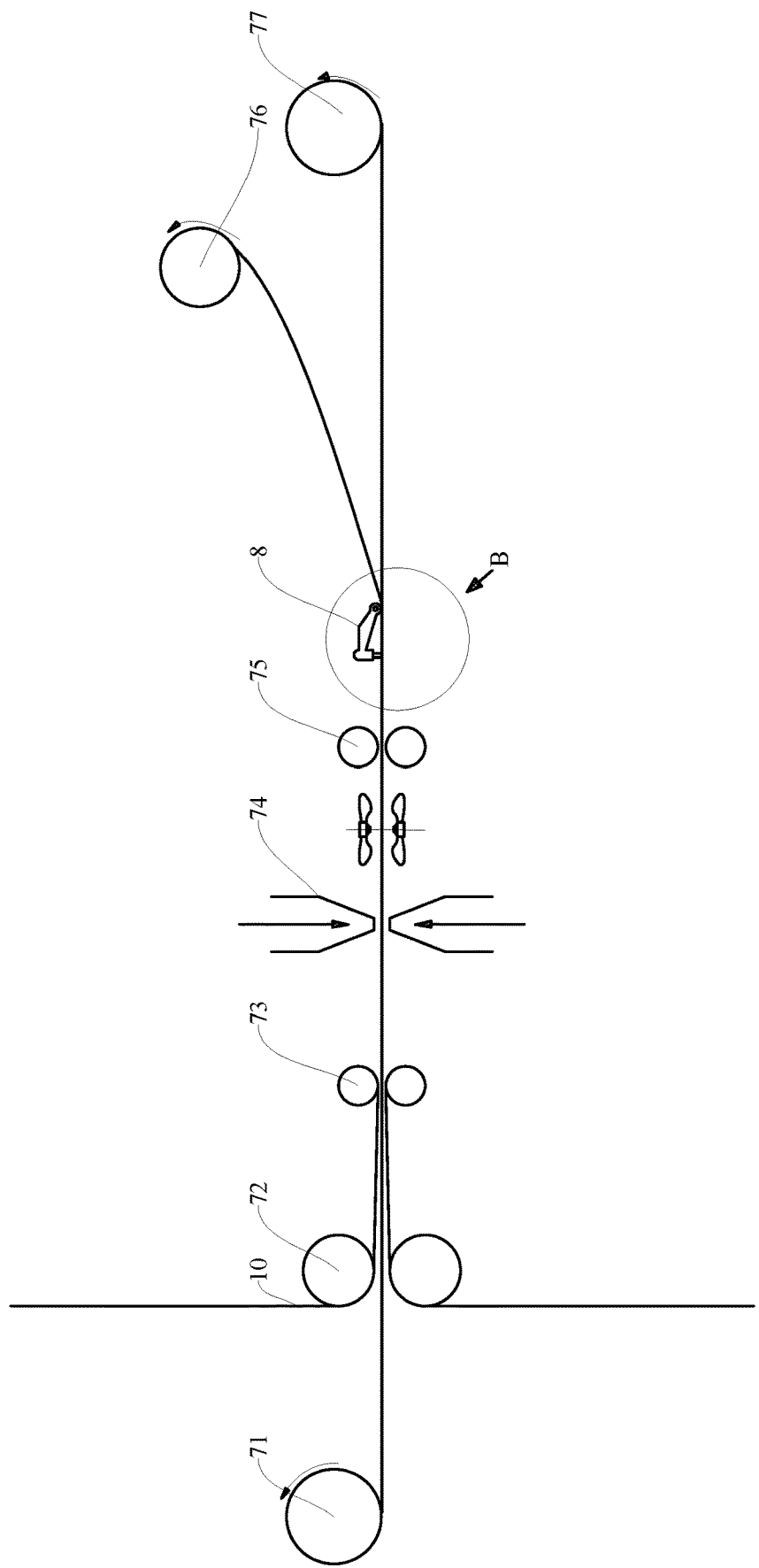
FIG. 6 is a schematic structural diagram of an automatic synthesis device for an artificial eyelash of the present invention.
Figure 7:
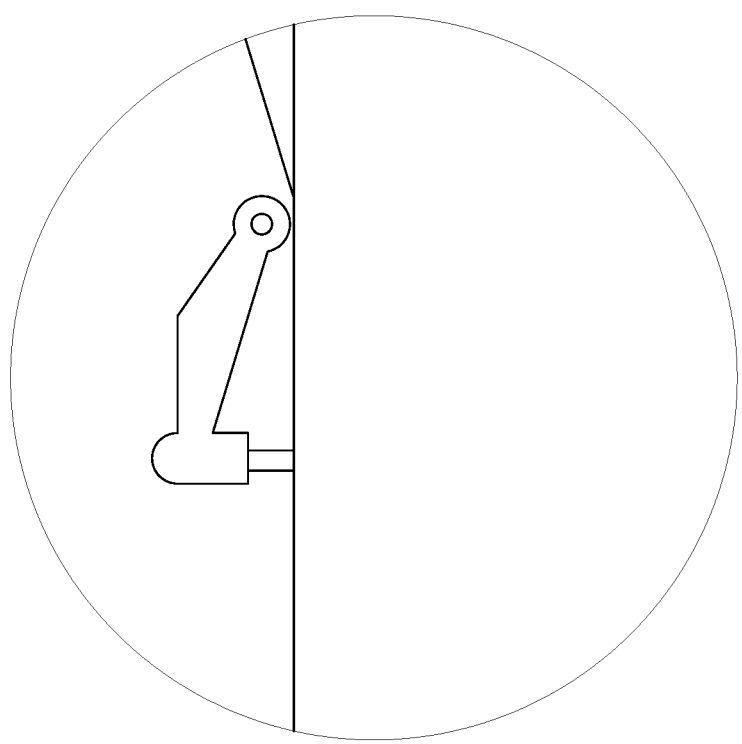
FIG. 7 is a locally enlarged view of a B part in FIG. 6.
Figure 8:
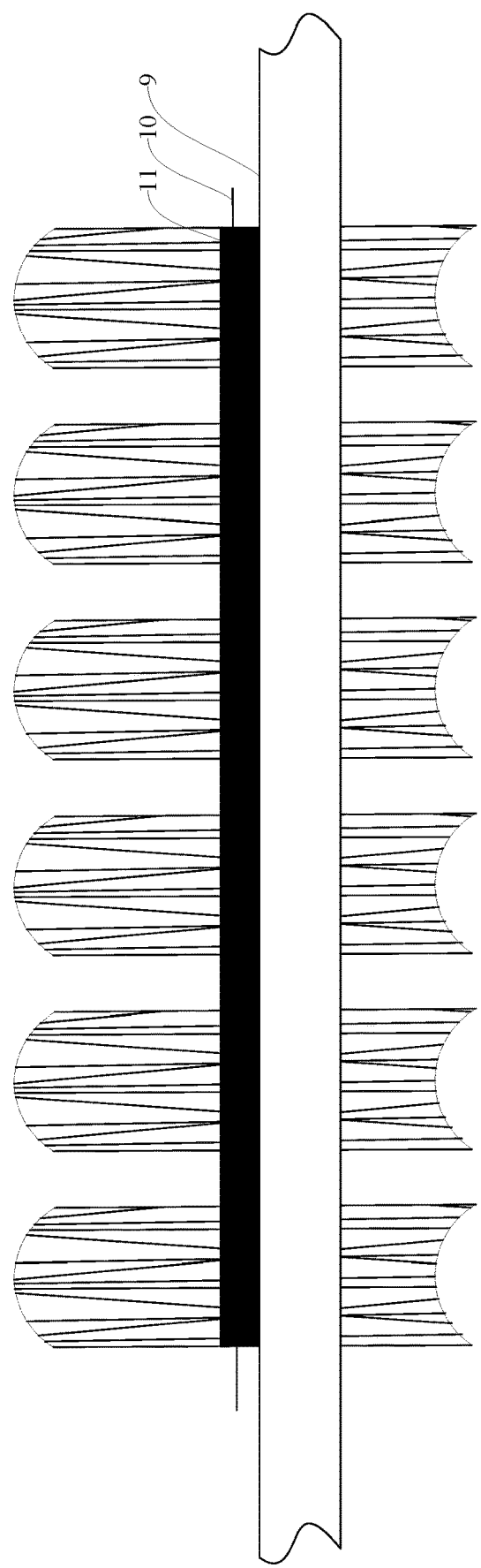
FIG. 8 is a schematic structural diagram of a multi-layer eyelash sticker to be cut.

With reference to FIG. 1 to FIG. 8:

Specific Embodiment 1

An automatic pressing and sticking device for an artificial eyelash with a naturally arc-shaped stem comprises a transmission mechanism for transmitting a double-sided adhesive tape, a limiting mechanism 2 for storing the artificial eyelash, a pressing mechanism 4 for pressing the double-sided adhesive tape to the limiting mechanism 2 to stick the artificial eyelash, and a control mechanism 3.

The transmission mechanism comprises two conveying rollers 1 arranged on two sides of the limiting mechanism 2; the double-sided adhesive tape is wound on the conveying roller 1; and the double-sided adhesive tape horizontally penetrates through a horizontal symmetry axis of the limiting mechanism 2 from left to right.

The limiting mechanism 2 comprises a bottom plate 21, a frame 22, an upper fixed module 23, a lower fixed module 24 and an adjusting screw 25. The frame 22 is fixedly connected and arranged above the bottom plate 21; the upper fixed module 23 is fixedly connected with an inside surface of an upper portion of the frame 22; a lower fixed frame is internally provided with a threaded hole; and the adjusting screw 25 penetrates through the threaded hole to move a lower fixed plate in a direction perpendicular to the double-sided adhesive tape.

The control mechanism 3 comprises a servo motor for controlling the two conveying rollers 1 to rotate, a photoelectric sensor 31 and a controller 32; and the servo motor, the sensor and the controller 32 are electrically connected. A distributing plate 45 is slidably connected with the frame 22 and vertically slides up and down along the frame 22.

The photoelectric sensor 31 is fixedly arranged at an upper portion of the bottom plate 21, the photoelectric sensor 31 is located on a right side of the upper fixed module 23, and the photoelectric sensor 31 is 1 mm to 2 mm away from the horizontal symmetry axis of the limiting mechanism 2.

Two conveying rollers 1 matched to rotate are used in the transmission mechanism, which can automatically finish transmission and sticking of the double-sided adhesive tape. The pressing mechanism 4 is matched with the transmission mechanism, after transmission for a certain distance, the transmission is suspended for pressing, and then the transmission is continued. Detection is performed by the photoelectric sensor 31 during this suspension, a detection signal is input to the controller 32, and the controller 32 controls the servo motor to start and stop according to the input signal.

The limiting mechanism 2 is used, and a distance between the lower fixed module 24 and the upper fixed module 23 can be adjusted through the adjusting screw 25 at a lower portion of the limiting mechanism, thus adapting to manufacturing of artificial eyelashes of different sizes.

The pressing mechanism 4 comprises an air cylinder 41, a fixed frame, a pressing plate 42 and the distributing plate 45.

The fixed frame is fixedly connected with the bottom plate 21; the air cylinder 41 is fixedly arranged at a lower portion of the fixed frame, and a telescopic rod of the air cylinder 41 is fixedly connected with the pressing plate 42; the telescopic rod drives the pressing plate 42 to move up and down; a horizontal symmetry axis of the pressing plate 42 coincides with the horizontal symmetry axis of the limiting mechanism 2; the air cylinder 41 is electrically connected with the controller 32; and the distributing plate 45 is slidably connected with the frame 22 and vertically slides up and down along the frame 22.

The signal sent by the controller 32 controls the air cylinder 41 to start and stop, and the air cylinder 41 controls the telescopic rod to move up and down, so as to control the pressing plate 42 fixedly connected with the telescopic rod to be able to move up and down to finish pressing.

The air cylinder 41 is used to adjust the pressing plate 42 to move up and down so as to finish a pressing action, and the pressing plate 42 presses the distributing plate 45 downwardly to finish distribution of an eyelash material and finish pressing of the double-sided adhesive tape at the same time.

A lower surface of the pressing plate 42 is provided with a bulge 43, and the bulge 43 corresponds to a recess 44 on the distributing plate.

The structure above can ensure that the double-sided adhesive tape can receive a larger pressing force under the same output power of the air cylinder 41, so as to finish sticking and fastening of the artificial eyelash.

The limiting mechanism 2 is obliquely arranged at an included angle of 5° to 10° with a horizontal plane, and a vertical height of the upper fixed module 23 is lower than that of the lower fixed module 24.

The tiny artificial eyelash can be regulated under gravity by the offset design relative to the horizontal plane, thus avoiding a way of manually adjusting a lower adjusting nut repeatedly, so that an adjustment time of equipment can be saved to the greatest extent.

One side of the telescopic rod is fixedly connected with a punching assembly 5.

The punching assembly 5 comprises a horizontal fixed rod 51, a vertical punching rod 52 fixedly arranged at a lower portion of the horizontal fixed rod 51 and a punching seat 53 matched with the vertical punching rod 52; and the punching seat 53 is fixedly arranged at an upper portion of the bottom plate 21, and a hole for the vertical punching rod 52 to penetrate through is formed in the punching seat 53.

A telescopic action of the same air cylinder can finish two operations through the arrangement of the punching seat 53 and the fixed connection between the punching assembly 5 and one side of the telescopic rod. On one hand, the double-sided adhesive tape can be pressed, and on the other hand, the punching may be realized. According to the present invention, a detection accuracy can be further improved and a working load of the photoelectric sensor can be reduced by adopting the punching matched with the photoelectric sensor for detection. When the photoelectric sensor can sense that the double-sided adhesive tape with the hole passes through, a signal is sent to the controller, and the controller controls the servo motor to stop working.

Specific Embodiment 2

Based on Embodiment 1, the hole in the punching seat 53 is communicated with a through channel on one side of the frame at the lower portion downwardly, which can ensure that the double-sided adhesive tape produced by punching continuously flows out of the through channel, thus avoiding blockage in the punching seat 53. The photoelectric sensor 31 is arranged at a position corresponding to the vertical punching rod 52, and used for detecting the punching and judging whether first sticking is finished.

Specific Embodiment 3

An automatic synthesis device for an artificial eyelash adopts the single-layer eyelash sticker produced by the automatic pressing and sticking device for the artificial eyelash above, and further comprises a feeding roller assembly, a distributing roller assembly arranged on a left side of the feeding roller assembly, a synthesis extrusion roller assembly arranged on a left side of the distributing roller assembly, a recycling roller assembly for recovering interleaving paper and a collecting roller for collecting a multi-layer eyelash sticker. One eyelash thread 10 is an elastic thread, and the other eyelash thread is a non-elastic thread.

The feeding roller assembly, the distributing roller assembly, the synthesis extrusion roller assembly, the recycling roller assembly and the collecting roller are all provided with a fixing device for fixing.

The automatic synthesis device for the artificial eyelash is used for synthesizing more than three single-layer eyelash stickers into a multi-layer eyelash sticker.

The feeding roller assembly comprises N feeding rollers 61, N is greater than 3, and N is a natural number.

The distributing roller assembly comprises N distributing rollers 62, the synthesis extrusion roller assembly is composed of two extrusion rollers 63 arranged in elastic contact, and the recycling roller assembly comprises N recycling rollers 64; N sets of single-layer eyelash stickers are provided; the N sets of single-layer eyelash stickers are respectively separated from the interleaving paper on the single-layer eyelash stickers through the N distributing rollers 62; and the separated interleaving paper is recovered through the recycling roller assembly.

The N sets of single-layer eyelash stickers pass through the two extrusion rollers 63 and then are wound on the collecting roller assembly.

A plurality of single-layer eyelash stickers can be synthesized into one multi-layer eyelash sticker by matching of the feeding roller assembly, the distributing roller assembly, the synthesis extrusion roller assembly, the recycling roller assembly and the collecting roller, thus avoiding labor hour consumption by manually aligning and sticking one by one.

The collecting roller assembly is composed of one collecting roller 65 or N collecting rollers 65.

Combination of a plurality of collecting rollers 65 into one saves design materials of equipment, and an effect of collecting the interleaving paper by a plurality of collecting rollers 65 can be realized by using one collecting roller 65.

Specific Embodiment 4

An automatic gluing and shearing device adopts the multi-layer eyelash sticker produced by the automatic synthesis device for the artificial eyelash above, wherein the multi-layer eyelash sticker is wound on a feeding roller 71, and the multi-layer eyelash sticker sequentially passes through an eyelash thread roller 72, a front limiting roller 73, a glue injection mechanism 74, a rear limiting roller 75 and a cutting mechanism 8 from left to right.

The eyelash thread roller 72, the front limiting roller 73, the glue injection mechanism 74, the rear limiting roller 75 and a finished product roller 76 are all provided with a fixing device for fixing.

The eyelash thread roller 72 places an eyelash thread 10 on the multi-layer eyelash sticker through the front limiting roller 73.

The glue injection mechanism 74 injects glue on the eyelash thread 10.

The rear limiting roller 75 leads out the multi-layer eyelash sticker with the glue and the eyelash thread 10.

After leading out the multi-layer eyelash sticker, the drying mechanism dries the glue through a fan.

The cutting mechanism 8 performs linear cutting along the horizontal symmetry axis of the limiting mechanism.

The multi-layer eyelash sticker is divided into a finished product and a waste material after being cut by the cutting mechanism 8; and the finished product enters the finished product roller 76, and the waste material enters a waste material roller 77.

The eyelash thread 10 passes through the eyelash thread roller 72 and then is combined with the multi-layer eyelash sticker on the feeding roller 71 entering horizontally. The mechanism above can finish subsequent cutting positioning and glue sticking through the eyelash thread 10, and the cutting mechanism 8 presses cutting teeth on a material to be processed through contraction of a hydraulic rod on a lower side to finish cutting.

The eyelash thread rollers 72, the front limiting rollers 73, the glue injection mechanisms 74, the rear limiting rollers 75 and the finished product rollers 76 are all symmetrically arranged along upper and lower surfaces of the multi-layer eyelash sticker.

The symmetrical arrangement of the present application forms a glue layer 11, which increases a fixing stability of the eyelash thread 10 and improves a glue injection efficiency, thus improving a rate of finished products of equipment.

On this basis, a drying mechanism may be arranged between the glue injection mechanism 74 and the rear limiting roller 75, and the glue is quickly dried through a hot air fan, which can reduce a distance between the glue injection mechanism 74 and the rear limiting roller 75 in a flowing direction, thus reducing a manufacturing cost of equipment.

A preparation technology for an artificial eyelash with a naturally arc-shaped stem adopts the automatic gluing and shearing device above, and comprises the following steps of:

step A: placing the cut artificial eyelash between the upper fixed module 23 and the lower fixed module 24 in the frame 22;

step B: adjusting a distance between the upper fixed module 23 and the lower fixed module 24 by rotating the adjusting screw 25 to adapt to a size of the finished product of the artificial eyelash to be processed;

step C: winding the double-sided adhesive tape on surfaces of the two conveying rollers 1 and allowing the double-sided adhesive tape to pass through the limiting mechanism 2;

step D: manually starting the pressing mechanism 4 to test whether a pressing device is normal;

step E: starting the automatic pressing and sticking device;

step F: transferring the conveying roller 1 with the single-layer eyelash sticker wound on a surface to the feeding roller 61 in the feeding roller assembly;

step G: starting the automatic synthesis device for the artificial eyelash to finish manufacturing the multi-layer eyelash sticker;

step H: transferring the collecting roller with the multi-layer eyelash sticker wound on a surface to the automatic gluing and shearing device as the feeding roller 71; and step I: starting the automatic gluing and shearing device to finish gluing and shearing.

The invention claimed is:

1. An automatic gluing and shearing device adopting a multi-layer eyelash sticker produced by an automatic synthesis device for an artificial eyelash, wherein the multi-layer eyelash sticker is wound on a feeding roller (71), and the multi-layer eyelash sticker sequentially passes through a first eyelash thread roller (72), a first front limiting roller (73), a first glue injection mechanism (74), a first rear limiting roller (75), a drying mechanism and a cutting mechanism (8) from left to right;
    an eyelash thread (10) is placed on the multi-layer eyelash sticker through the front limiting roller (73);
    a glue is applied on the eyelash thread (10) through the glue injection mechanism (74); wherein the glue is dried through a fan;
    the multi-layer eyelash sticker with the glue and the eyelash thread (10) is guided to the cutting mechanism by the rear limiting roller (75);
    a linear cutting along the horizontal symmetry axis of the limiting mechanism (2) is performed by the cutting mechanism (8);
    the multi-layer eyelash sticker is divided into a finished product and a waste material after being cut by the cutting mechanism (8); wherein the finished product is guided to a first finished product roller (76), and the waste material is guided to a waste material roller (77).

2. The automatic gluing and shearing device according to claim 1, wherein the first eyelash thread roller (72) and a second eyelash thread roller are symmetrically arranged along upper and lower surfaces of the multi-layer eyelash sticker;
    the first front limiting roller (73) and a second front limiting roller are symmetrically arranged along upper and lower surfaces of the multi-layer eyelash sticker;
    the first glue injection mechanism (74) and a second glue injection mechanism are symmetrically arranged along upper and lower surfaces of the multi-layer eyelash sticker;
    the first rear limiting roller (75) and a second rear limiting roller are symmetrically arranged along upper and lower surfaces of the multi-layer eyelash sticker; and the first finished product roller (76) and a second finished product roller are symmetrically arranged along upper and lower surfaces of the multi-layer eyelash sticker.

\* \* \* \* \*